US009594968B1

(12) United States Patent
Hodgman et al.

(10) Patent No.: US 9,594,968 B1
(45) Date of Patent: Mar. 14, 2017

(54) BIOMETRIC PROFILE CREATION

(71) Applicants: Roy Hodgman, Wenham, MA (US); Christopher Corde, Brighton, MA (US); Joshua Ungar, Brookline, MA (US); John G. Linn, Carlisle, MA (US); Todd A. Morneau, Sudbury, MA (US)

(72) Inventors: Roy Hodgman, Wenham, MA (US); Christopher Corde, Brighton, MA (US); Joshua Ungar, Brookline, MA (US); John G. Linn, Carlisle, MA (US); Todd A. Morneau, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 206 days.

(21) Appl. No.: 13/628,850

(22) Filed: Sep. 27, 2012

(51) Int. Cl.
*G06K 9/00* (2006.01)
*G06K 9/62* (2006.01)

(52) U.S. Cl.
CPC ..... *G06K 9/00892* (2013.01); *G06K 9/00926* (2013.01); *G06K 9/6288* (2013.01)

(58) Field of Classification Search
USPC .................................................. 382/124, 116
See application file for complete search history.

(56) References Cited

U.S. PATENT DOCUMENTS

| 5,761,329 | A | * | 6/1998 | Chen | G06K 9/00892 382/116 |
| 5,815,252 | A | * | 9/1998 | Price-Francis | G07C 9/00087 235/492 |
| 5,887,140 | A | * | 3/1999 | Itsumi | G06F 21/32 340/5.53 |
| 6,072,891 | A | * | 6/2000 | Hamid | G07C 9/00158 382/116 |
| 6,799,275 | B1 | * | 9/2004 | Bjorn | G06F 21/32 283/67 |
| 7,646,893 | B2 | * | 1/2010 | Yamada | G06K 9/00006 382/115 |
| 8,024,189 | B2 | * | 9/2011 | Zhang | G06K 9/4614 382/116 |
| 8,064,646 | B2 | * | 11/2011 | Hagino | G06F 21/32 340/5.2 |
| 8,122,259 | B2 | * | 2/2012 | Menczel | G06K 9/00885 340/5.52 |
| 8,242,882 | B2 | * | 8/2012 | Ikegami | G06K 9/00892 340/5.53 |
| 8,306,277 | B2 | * | 11/2012 | Ichimasa | G06K 9/6807 382/115 |
| 8,661,516 | B2 | * | 2/2014 | Yamada | G06K 9/00006 382/115 |

(Continued)

*Primary Examiner* — Kathleen Y Dulaney
(74) *Attorney, Agent, or Firm* — Krishnendu Gupta; Jason A. Reyes

(57) ABSTRACT

There is disclosed a method for use in authenticating a user. The method comprises obtaining a biometric input comprising a plurality of biometric attributes distinct to a user. Additionally, the method comprises selecting at least one biometric attribute in the obtained biometric input as a currently active biometric attribute. Furthermore, the method comprises based on the at least one selected currently active biometric attribute, creating a currently active biometric profile for the user for facilitating the authentication of the user.

2 Claims, 7 Drawing Sheets

(56) References Cited

U.S. PATENT DOCUMENTS

| | | | | |
|---|---|---|---|---|
| 8,699,763 B2* | 4/2014 | Nada | G06K 9/00087 | 382/116 |
| 2001/0032096 A1* | 10/2001 | Uchida | G06Q 10/08 | 382/115 |
| 2002/0176610 A1* | 11/2002 | Okazaki | G06K 9/00221 | 382/118 |
| 2002/0191817 A1* | 12/2002 | Sato | G07C 9/00158 | 382/118 |
| 2003/0163710 A1* | 8/2003 | Ortiz | H04L 63/0861 | 713/186 |
| 2006/0129840 A1* | 6/2006 | Milgramm | G06F 21/32 | 713/186 |
| 2006/0239512 A1* | 10/2006 | Petrillo | G06F 21/31 | 382/115 |
| 2007/0253608 A1* | 11/2007 | Tulyakov | G06K 9/00073 | 382/125 |
| 2007/0286465 A1* | 12/2007 | Takahashi | G06F 21/32 | 382/125 |
| 2008/0253619 A1* | 10/2008 | Hagino | G06F 21/32 | 382/115 |
| 2008/0298648 A1* | 12/2008 | Lo | G06K 9/00067 | 382/125 |
| 2009/0154780 A1* | 6/2009 | Jang | G06F 21/32 | 382/125 |
| 2009/0175506 A1* | 7/2009 | Polcha | G06K 9/00013 | 382/116 |
| 2010/0017618 A1* | 1/2010 | Golic | G06K 9/00288 | 713/186 |
| 2010/0111376 A1* | 5/2010 | Yan | G06K 9/00268 | 382/118 |
| 2011/0135165 A1* | 6/2011 | Wechsler | G06K 9/6228 | 382/118 |
| 2011/0228989 A1* | 9/2011 | Burton | G06F 21/32 | 382/116 |
| 2012/0057763 A1* | 3/2012 | Horng | G06K 9/00067 | 382/115 |
| 2012/0195475 A1* | 8/2012 | Abiko | G06T 7/00 | 382/115 |
| 2012/0250954 A1* | 10/2012 | Nada | G06K 9/00087 | 382/124 |
| 2013/0028488 A1* | 1/2013 | Abe | G06K 9/036 | 382/115 |

* cited by examiner

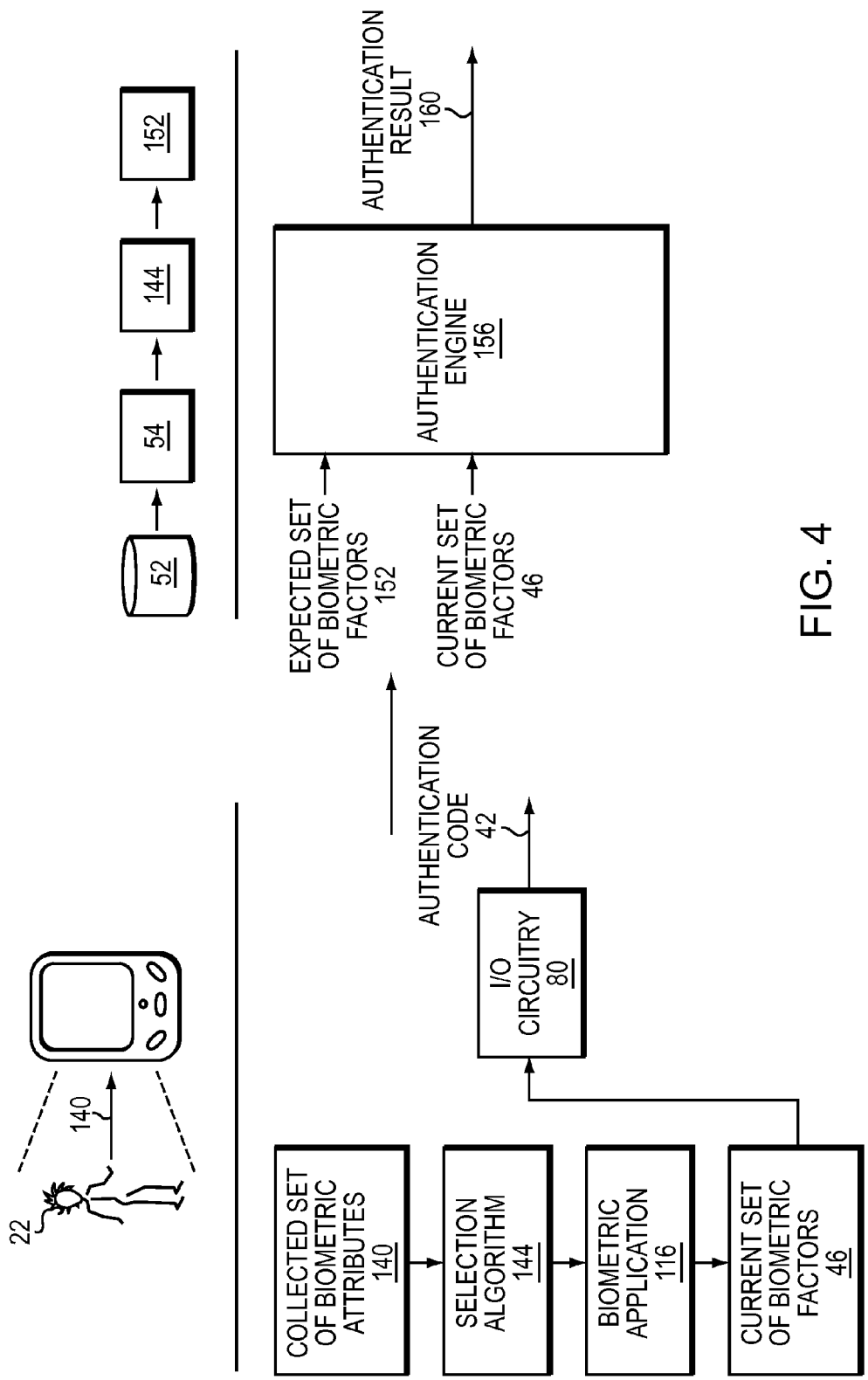

BIOMETRIC PROFILE CREATION

TECHNICAL FIELD

The present invention relates to user authentication.

BACKGROUND OF THE INVENTION

Generally, an authentication system is used to verify the identity of a user before granting access to an access-controlled resource. The goal of such a system is to accurately determine the identity of a user such that an unauthorized user cannot gain access to the resource. It will be appreciated that the system can use several factors alone or in combination to authenticate a user for enabling access to the controlled resource. For example, the system can authenticate the user by using something the user knows, such as a code word, password, personal identification number ("PIN") and the like. In a typical implementation, the user communicates a username and a password to an authentication server which typically possesses such information for each authorized user. It will be understood that a user will be successfully authenticated subject to the server receiving the correct password for the authorized user.

It will also be understood that the system can authenticate the user by using something the user possesses, such as a hardware authenticator (sometimes called a token) and an authentication server which work together to grant a token holder with login access using one-time use passwords (OTPs). Such OTPs are often referred to as OTP codes, one-time passcodes, and pseudo-random numbers, among other terms. To this end, both the token and the authentication server share a cryptographic key which is not otherwise known. The token uses this key to produce a series of OTPs. Concurrently, the authentication server carries out the same operations on its end to produce the same series of OTPs. Accordingly, at any time, the token holder is capable of providing a matching OTP from the token to the authentication server to prove that the token holder possesses the token.

It will also be understood that the system can authenticate the user by using something the user is, such as a distinct characteristic or attribute known as a biometric. It will be known by those skilled in the art that a biometric is a physical or behavioral characteristic or attribute that can be used to identify or distinguish one person from another person with a certain amount of confidence. For example, the system can analyze images of human faces. When the system receives a first image of a human face, the system measures the sizes, shapes, and/or positions of the subject's eyes, nose, mouth, and cheeks, among other features. The system then saves these face geometry measurements for later matching. When the system receives a second image of a human face in the future, the system can perform this measurement operation again. That is, in the same manner as for the first image, the system can measure the sizes, shapes, and/or positions of eyes, nose, mouth, and cheeks of the subject's face, etc. in the second image. The system can then match these face geometry measurements taken from the second image against the saved face geometry measurements taken from the first image. If the system determines that the face geometry measurements match within a predefined threshold of certainty, the system outputs a result indicating that the subject in the second image is the same as the subject in the first image. However, if the system determines that the face geometry measurements do not match within the predefined threshold of certainty, the system outputs a result indicating that the subject in the second image is not the same as the subject in the first image. Such results may be used to manage access to a protected or controlled resource such as a room, or an account on a computer.

Unfortunately, there are deficiencies in the above-described conventional systems. For example, the above-described conventional facial recognition system is highly susceptible to replay attacks. Suppose that a legitimate user utilizes such a system to control access to an account on a computer. That is, to login to the computer, the user allows the computer to capture an image of the user's face (e.g., via a webcam), measure the user's facial parameters, and match these measurements to previous face geometry measurements.

In such a situation, it is easy for a perpetrator to simply present a previously-obtained photograph of the user's face to the computer. In response, the computer would capture an image of the user's face from the photograph, measure the user's facial parameters from that image, and match these face geometry measurements to previous face geometry measurements. Accordingly, the computer would allow the perpetrator to login to the user's computer account. There is, therefore, a need for stronger forms of authentication.

SUMMARY OF THE INVENTION

There is disclosed a method for use in authenticating a user. The method comprising obtaining a biometric input comprising a plurality of biometric attributes distinct to a user; selecting at least one biometric attribute in the obtained biometric input as a currently active biometric attribute; and based on the at least one selected currently active biometric attribute, creating a currently active biometric profile for the user for facilitating the authentication of the user.

Additionally, there is disclosed a system for use in authenticating a user. The system comprising a network interface; a memory; and a controller which includes controlling circuitry coupled to the memory, the controlling circuitry being constructed and arranged to obtain a biometric input comprising a plurality of biometric attributes distinct to a user; select at least one biometric attribute in the obtained biometric input as a currently active biometric attribute; and based on the at least one selected currently active biometric attribute, create a currently active biometric profile for the user for facilitating the authentication of the user.

Moreover, there is disclosed an electronic apparatus for co-operating with the system according to the invention for use in authenticating a user. The electronic apparatus comprising input/output (TO) circuitry; a memory; and a controller coupled to the TO circuitry and the memory, the controller being constructed and arranged to obtain a biometric input from a user comprising the at least one currently active biometric attribute; and output an authentication output including at least one biometric factor based on the at least one selected currently active biometric attribute, wherein the authentication output acts as an authentication input to a user authentication operation performed by the system.

Furthermore, there is disclosed a computer program product having a non-transitory, computer-readable storage medium which stores code for use in authenticating a user, the code including instructions to obtain a biometric input comprising a plurality of biometric attributes distinct to a user; select at least one biometric attribute in the obtained biometric input as a currently active biometric attribute; and based on the at least one selected currently active biometric attribute, create a currently active biometric profile for the user for facilitating the authentication of the user.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a block diagram of particular details of an operation of the electronic apparatus of FIG. 2 and the authentication server of FIG. 3.

DETAILED DESCRIPTION

Conventionally, when using a biometric authentication system, a user must submit biometric enrollment data to the system which can be used to create a biometric profile for the user. The biometric profile is a set of characteristics extracted from the user's enrollment data to be used during authentication operations for the user. However, it will be appreciated that if the biometric profile comprising the set of extracted characteristics was compromised the biometric profile cannot be revoked and recreated using the biometric enrollment data as initially submitted. If the biometric profile was revoked and recreated, the subsequent profile would be substantially similar to the original one, obviating the need for the revocation, and leaving it susceptible to an attack if the original profile had been compromised.

Described below is a technique for use in authenticating a user. The technique selects a subset of measurable biometric information to be presented by an electronic apparatus to an authentication server in order to demonstrate the user's identity. The subset of measurable information is dynamic and can be derived based on random selection (e.g., PRNG). An authentication server can match the presented information against the user profile. The selected subset may be chosen based on a varying secret value shared between the user and the authentication server. It will be appreciated that a subsequent authentication request can result in the selection of different biometric information for the user.

Figure 1:
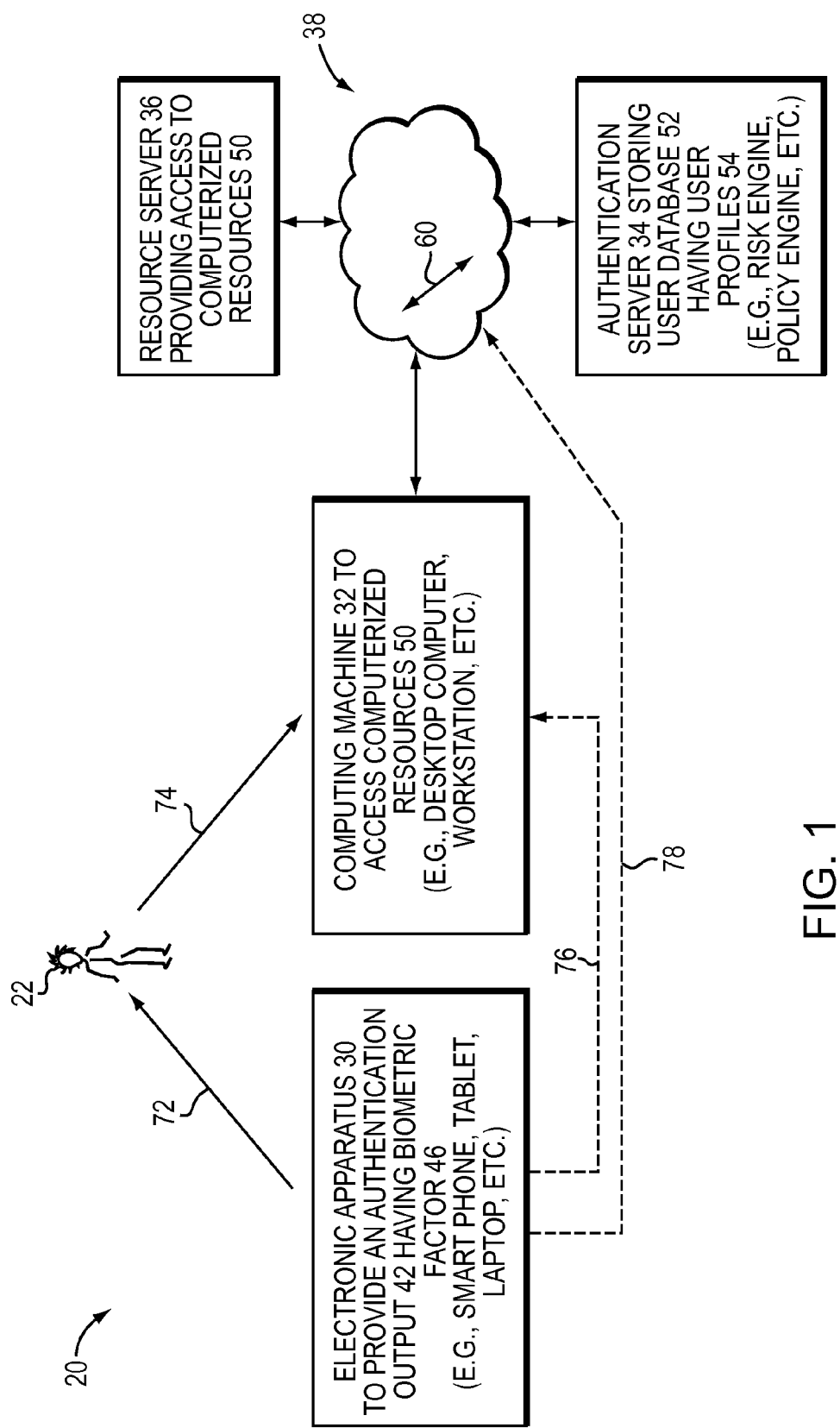
FIG. 1 is a block diagram of an electronic environment which utilizes authentication outputs having biometric factors to authenticate a user.

Referring to FIG. 1, there is illustrated an electronic environment 20 which utilizes authentication outputs having biometric factors to authenticate a user 22. The electronic environment 20 includes an electronic apparatus 30, a computing machine 32, an authentication server 34, a resource server 36, and a communications medium 38.

The electronic apparatus 30 provides authentication outputs such as authentication codes 42 having biometric factors 46 for authenticating the user 22. Examples of suitable electronic apparatus 30 include smart phones, wireless book readers, tablets, netbooks, laptops, general client-style devices and the like.

The computing machine 32 is constructed and arranged to facilitate user access to a computerized resource 50. Examples of suitable computing machines 32 include desktop PCs, workstations, general purpose computers, and so on.

The authentication server 34 includes a user database 52. The authentication server 34 is constructed and arranged to store user profiles 54 for multiple users in the user database 52, and to perform authentication operations using the user profiles 54. For example, it will be appreciated that the user profiles 54 will store user-specific data. In some arrangements, the authentication server 34 can include a risk engine and/or policy engine to perform complex authentication operations based on multiple risk-based authentication factors.

The resource server 36 provides access to one or more computerized resources 50 following successful user authentication with the authentication server 34. An example of a suitable resource provider 36 is a data storage array which provides secure access to files, directories, volumes, LUNs, etc. Another example of a suitable resource provider 36 is a web server which provides secure access to various web pages. Yet another example of a suitable resource provider 36 is a server which provides secure user account and/or transactional access such as that for an online banking site, an online store, an online gaming site, and so on. Other types of resource providers 36 are suitable for use as well (e.g., ISPs, VPNs, etc.).

It should be understood that the computerized resources 50 are shown as residing on the resource provider 36 by way of example only. In other arrangements, the computerized resources 50 reside at different locations, e.g., locally on the computing machine 32, co-located at the authentication server 34, within the electronic apparatus 30, etc.

The communications medium 38 connects the various components of the electronic environment 20 together to enable these components to exchange electronic signals 60 (e.g., see the double arrow 60). At least a portion of the communications medium 38 is illustrated as a cloud to indicate that the communications medium 38 is capable of having a variety of different topologies including backbone, hub-and-spoke, loop, irregular, combinations thereof, and so on. Along these lines, the communications medium 38 may include copper-based devices and cabling, fiber optic devices and cabling, wireless devices, combinations thereof, etc.

During operation, the user 22 is capable of authenticating with the authentication server 34 by using the electronic apparatus 30 to obtain an authentication output 42 as part of an authentication attempt. The authentication output 42 includes a set of biometric factors 46 (i.e., one or more biometric factors 46). The authentication output 42 is delivered to the authentication server 34 in the hope of successfully authenticating with the authentication server 34. It will be understood from further descriptions below that the authentication output may also in some embodiments comprise a token code (e.g., a one-time use password) in combination with the set of biometric factors 46 to provide an even stronger form of authentication.

In some arrangements, the user 22 views the authentication output 42 as an authentication code 42 on a display screen of the electronic apparatus 30, and then manually enters the authentication code 42 into an application running on the computing machine 32 (e.g., a web browser, a front-end program, an authentication client, etc.). This situation is illustrated by the two arrows 72, 74 adjacent the user 22. If authentication is successful, the user 22 is then able to access the computerized resource 50 using the computing machine 32. However, if authentication is unsuccessful, the user 22 is prohibited from accessing the computerized resource 50 using the computing machine 32.

In another arrangement, the electronic apparatus 30 sends the authentication code 42 to the computing machine 32 which then sends the authentication code 42 to the authentication server 34. Such operation can be viewed by the user 22 or be transparent to the user 22. This situation is illustrated by the dashed arrow 76 leading from the electronic apparatus to the computing machine 32. Again, the user 22 is only able to access the computerized resource 50 using the computing machine 32 if authentication is successful.

In yet another arrangement, the electronic apparatus 30 sends the authentication code 42 directly to the authentication server 34. This situation is illustrated by the dashed arrow 78 leading from the electronic apparatus 30 to the communications medium 38. If authentication is successful, the authentication server 34 allows the user 22 to access the computerized resource 50. Otherwise, access to the computerized resource 50 is denied. Further details will now be provided with reference to FIG. 2.

Figure 2:
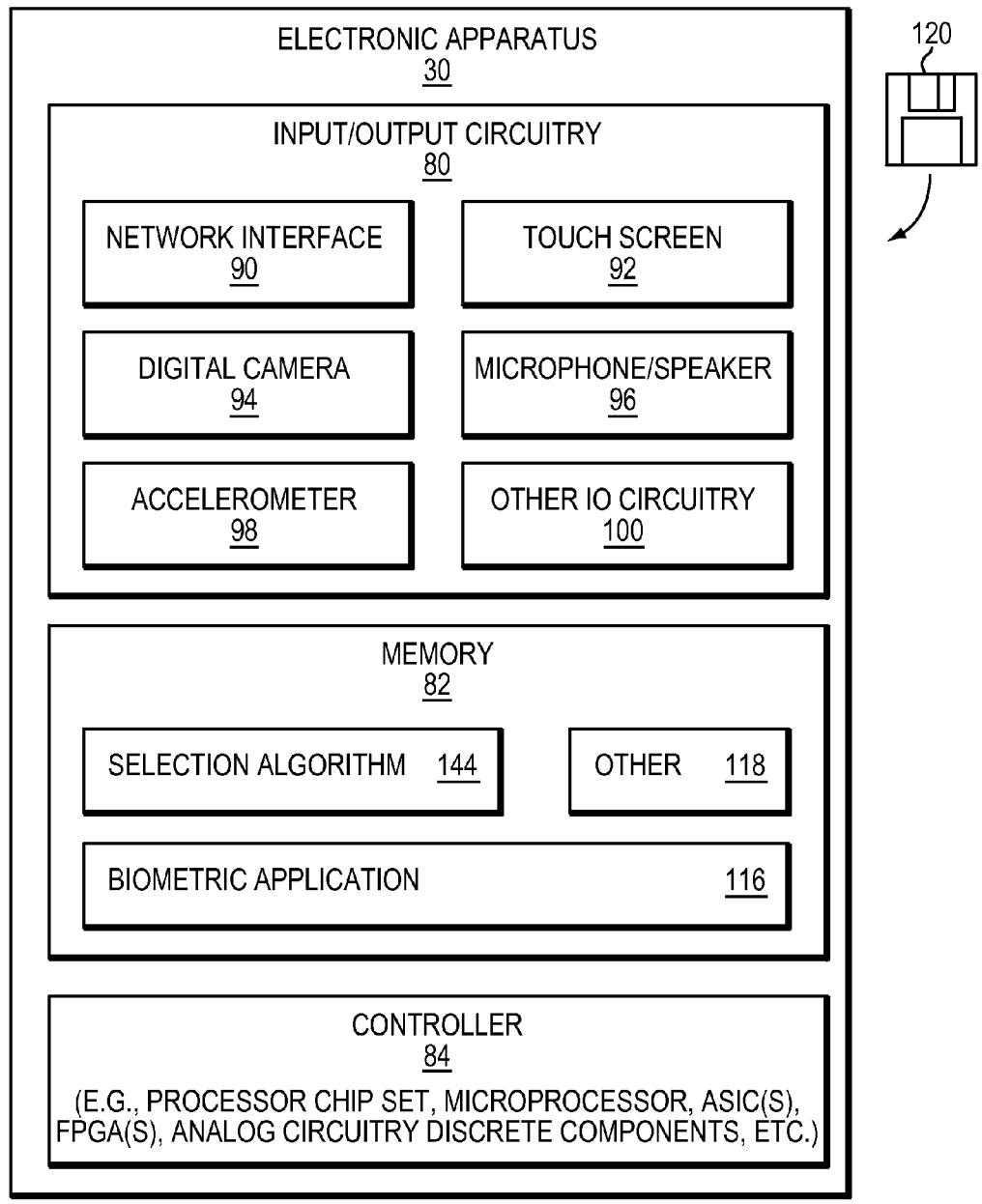
FIG. 2 is a block diagram of an electronic apparatus of the electronic environment of FIG. 1.

Referring to FIG. 2, there is illustrated the electronic apparatus 30 of the electronic environment 20. The electronic apparatus 30 includes input/output (IO) circuitry 80, memory 82, and a controller 84.

The IO circuitry 80 is constructed and arranged to control input and output for the electronic apparatus 30. The IO circuitry 80 includes a network interface 90 (e.g., a network card, a wireless transceiver, etc.) to connect the electronic apparatus 30 to the computing machine 32 and the communications medium 38, a touch screen 92 for user IO, a digital camera 94 to capture video images, a microphone and speaker set 96 to exchange audio IO, an accelerometer 98 to capture motion of the electronic apparatus 30, and other IO circuitry 100 (e.g., an actual keyboard, GPS circuitry, etc.).

The memory 82 includes volatile storage and non-volatile storage. The memory 82 can store a variety of memory constructs including at least one biometric application 116 and a selection algorithm 144. The memory can also store other applications and data 118 (e.g., an operating system, control/status information, client applications, a phone book, etc.). It will be appreciated as described further below that the memory constructs may also include further constructs such as a soft token application and cryptographic material for enabling a token code such as a one-time use passcode to be generated.

The controller 84 is constructed and arranged to execute and access the various memory constructs stored therein. It should be understood that the controller 84 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 120 is capable of delivering all or portions of the software to the electronic apparatus 30. The computer program product 120 has a non-transitory (or non-volatile) computer readable medium which stores a set of instructions which controls one or more operations of the electronic apparatus 30. Examples of suitable computer readable storage media include tangible articles of manufacture and apparatus which store instructions in a non-volatile manner such as CD-ROM, flash memory, disk memory, tape memory, and the like.

During operation, the apparatus 30 obtains a biometric input from the user 22 (also see FIG. 1) via the IO circuitry 80. For example, it will be understood that when a user operates the apparatus 30 the user may be required to position his or her face within a field of view of the camera 94 such that an image of the user's face is provided to the apparatus 30. Such an image of the user's face can include a plurality of characteristics or biometric attributes distinct to the user which can be suitable for authentication. These characteristics can relate to the size, shape, and/or position of the subject's eyes, nose, mouth, and cheeks, among other features.

In this embodiment, the controller 84 can select at least one of the biometric attributes using a selection algorithm 144. It will be understood as described in further detail below that the algorithm 144 is synchronized with a similar algorithm in the authentication server 34. Accordingly, the controller 84 selects at least one of the biometric attributes rendered active by the server 34 for authentication. For example, the biometric attributes relating to any one of or a combination of the left eye, right eye, nose, mouth, jaw and the like can be active for authentication. Conversely, the non-selected attributes will be inactive for authentication. The controller 84 selects the currently active biometric attributes by using the synchronized selection algorithm 144 such that the active biometric attributes can assist in authenticating the user.

Next, the controller 84 processes the selected biometric attribute(s) obtained from the image by executing one or more of the biometric applications 116 and outputting a current authentication code 42 for use in authenticating the user 22 to the authentication server 34. If authentication is successful, the user 22 is permitted access to the computerized resource 50. However, if authentication is unsuccessful, the user 22 is denied access to the computerized resource 50.

Figure 3:
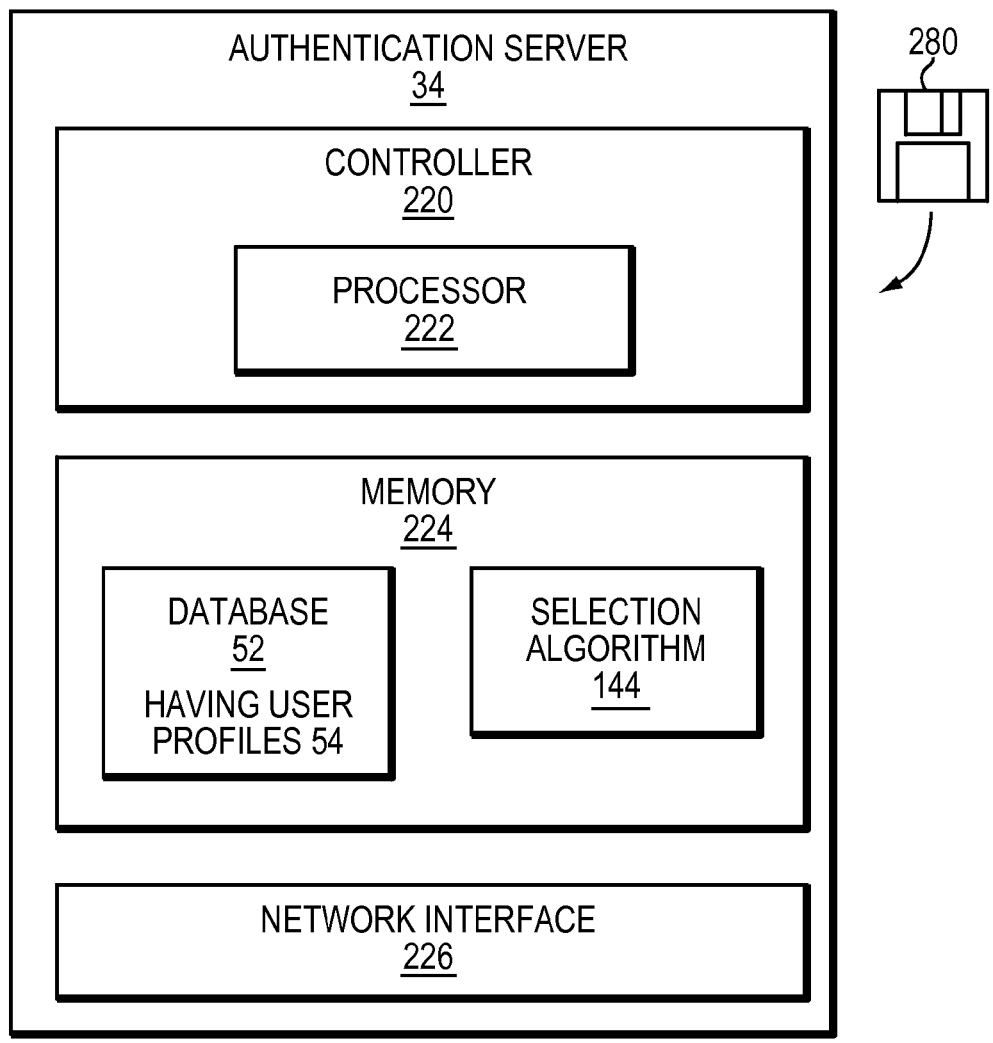
FIG. 3 is a block diagram of an authentication server of the electronic environment of FIG. 1.

Referring to FIG. 3, there is illustrated at least some of the components of an authentication server 34 comprising a controller 220, which in turn includes a processor 222, a memory 224 and a network interface 226.

The network interface 226 is constructed and arranged to send and receive data over communications medium 38. For example, the interface 226 is configured to receive authentication request over the communications medium 38 as well as to send acceptance or denial of authentication.

The memory 224 comprises a selection algorithm 144 and a user database 52 having user profiles 54. The memory 224 generally takes the form of, e.g., random access memory, flash memory or a non-volatile memory.

The processor 222 takes the form of, but is not limited to, Intel or AMD-based MPUs, and can include a single or multi-cores each running single or multiple threads. In the context of one or more processors running specialized software, a computer program product 280 is capable of delivering all or portions of the software to the authentication server 34. The computer program product 280 has a non-transitory (or non-volatile) computer readable medium which stores a set of instructions which controls one or more operations of the authentication server 34. Examples of suitable computer readable storage media include tangible articles of manufacture and apparatus which store instructions in a non-volatile manner such as CD-ROM, flash memory, disk memory, tape memory, and the like.

Referring to FIGS. 4 and 5, there is illustrated certain details of an example authentication process which is performed during an authentication attempt. FIG. 4 illustrates certain authentication activities which occur within the electronic apparatus 30 and the authentication server 34. FIG. 5 illustrates an example format for the authentication code 42.

As shown in FIG. 4, the electronic apparatus 30 collects a biometric input comprising a set of current biometric attributes 140 from the user 22. It will be understood that in some embodiments the biometric input can be an image of the user's face which comprises biometric attributes 140 or characteristics distinct to the user. Additionally, the touch screen 92 is extremely well suited for obtaining a biometric input by a contact-based input. For example, the touch screen 92 can obtain a user-drawn signature as a biometric input. It will be appreciated that the user-drawn signature can include distinct attributes such as speed, angle, pressure, acceleration and shape of the signature suitable for identification of the user.

Thereafter, the electronic apparatus 30 will select one or more currently active biometric attributes from the current set of biometric attributes 140 using the synchronized selection algorithm 144. For example, the electronic apparatus 30 can select portions of the user's face currently active for authentication. It will be understood that this will create a sub-set of biometric attributes from the selected portions of the face for facilitating authentication of the user. It will be understood that the currently inactive attributes will not facilitate authentication.

Next, a biometric application 116 processes the selected biometric attribute(s). The biometric application 116 will also in this arrangement output the processed selected biometric attribute as a current biometric factor 46 (e.g., a normalized eye/nose distance, etc.).

The electronic apparatus 30 then forms a current authentication code 42 including the current set of biometric factor(s) 46. The authentication code 42 is then sent from the electronic apparatus 30 to the authentication server 34 directly or indirectly (see paths 72-78 in FIG. 1).

Figure 5A:
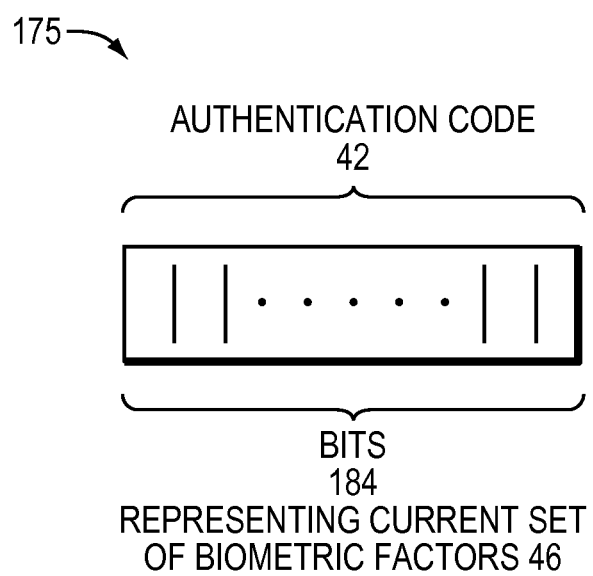
FIGS. 5(a) and (b) are block diagrams of example formats of authentication codes that can be utilized by the electronic environment of FIG. 1.

Referring to FIG. 5(a), there is illustrated an example format 175 for the authentication code 42 which can be presented as a string of alphanumeric characters. In the format 175, the authentication code 42 includes bits 184 which represent the current set of biometric factors 46. The authentication code 42 can take the form of a fixed number of hexadecimal values (e.g., 6 hex digits, 8 hex digits, 10 hex digits, etc.), ASCII values, and so on.

With attention back on FIG. 4, the authentication server 34 comprises a database 52 having user profiles 54. For example, the user profile 54 can comprise the image of the user's face. Additionally, as discussed above, the server 34 comprises the selection algorithm 144 which is synchronized with the algorithm 144 in the electronic apparatus 30. It will be understood that the server 34 can generate an expected set of biometric factor(s) 152 for authenticating the user 22. In particular, as part of the current authentication attempt, it should be understood that the user 22 has separately provided a user identifier (i.e., who the user 22 claims to be). The authentication server 34 retrieves a particular user profile 54 from the user database 52 corresponding to the user identifier, selects the current active biometric attributes using the selection algorithm 144, thus creating a currently active biometric profile for the user, and then generates the expected set of biometric factor(s) 152.

Next, an authentication engine 156 of the authentication server 34 inputs the set of biometric factor(s) 46 received from the electronic apparatus 30, as well as the locally generated set of biometric factor(s) 152. The authentication engine 156 evaluates these inputs and then provides an authentication result 160 indicating whether authentication is successful.

Figure 5B:
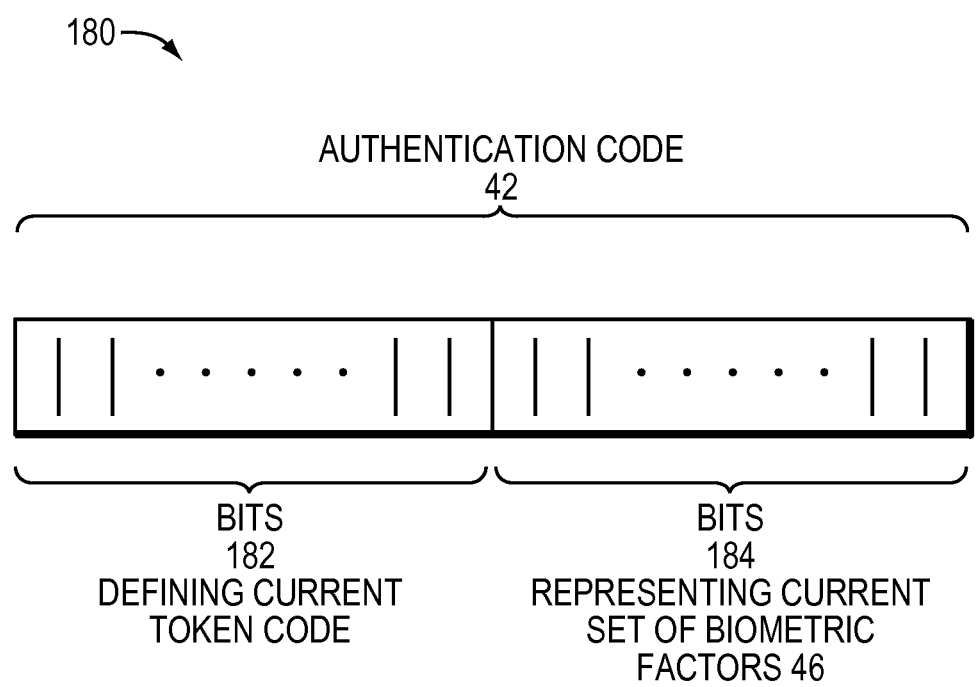

Referring to FIG. 5(b), there is illustrated a second example format 180 for the authentication code 42 which can be presented as a string of alphanumeric characters. In the format 180, the authentication code 42 includes bits 182 which represent a token code and bits 184 which represent the current set of biometric factor(s) 46. The authentication code 42 can also take the form of a fixed number of hexadecimal values (e.g., 6 hex digits, 8 hex digits, 10 hex digits, etc.), ASCII values, and so on. As discussed above, this second example can provide an even greater form of authentication.

It will be appreciated that the above format 180 may be generated by the electronic apparatus 30 of FIG. 2 by also including in memory 82 of the apparatus a cryptographic key and a soft token application for generating a token code. The electronic apparatus 30 could then output, as the authentication code 42, a composite passcode including a token code and a set of biometric factors 46 based on the selected biometric attributes. The token code and the set of biometric factors 46 could then act as authentication inputs to a user authentication operation performed by the authentication server 34.

It will be appreciated that in this arrangement, the authentication engine 156 may actually perform a traditional multi-factor authentication operation. That is, the authentication engine 156 performs side-by-side comparisons of multiple authentication factors (i.e., OTPs, biometrics, etc.) when determining the authentication result 160.

In other arrangements, the authentication engine 156 can perform a weighted evaluation of several risk-based authentication factors in addition to assessing, for example, the token code and biometrics. In such a scenario, the authentication server 34 can perform a risk-based authentication operation which includes both the result of the token code comparison as well as the set of biometric factors 46 to form an authentication score. This authentication score provides an overall assessment of the level of risk that the user is not who they claim to be. For example, the higher the score the higher the risk, and the lower the score the lower the risk. Eventually, the authentication server 34 performs a final assessment of the risk score and outputs, as the authentication result 160, an indication of whether authentication is successful. The final assessment may include a comparison of the risk score to a risk threshold, a normalization of the risk score into a particular risk percentile, and so on.

The authentication result 160 is then used to allow or deny access to a computerized resource 50 (also see FIG. 1). For example, if authentication is successful, the authentication server 34 may send a signal to the resource server 36 which enables the user 22 to access a computer resource 50 (e.g., open a file, access an account, perform a transaction, etc.) on the resource server 36 through the computing machine 32. As another example, if authentication is successful, the authentication server 34 may send a signal to the computing machine 32 to allow the user to access a computer resource 50 on the computing machine 32, and so on.

Figure 6:
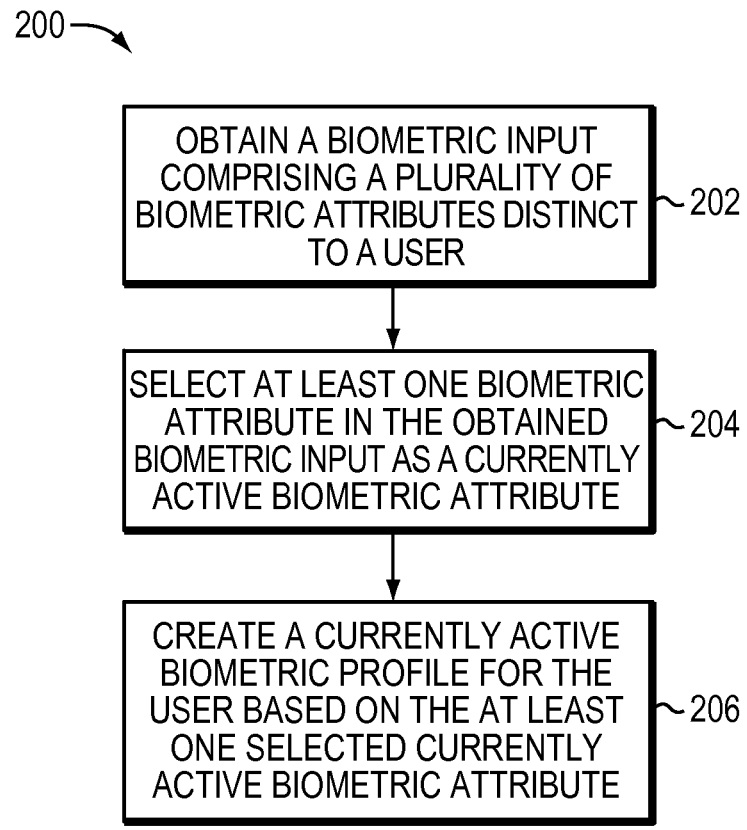
FIG. 6 is a flowchart of a procedure which is performed by the authentication server of FIG. 3.

Referring to FIG. 6, there is illustrated a flowchart of a procedure 200 which is performed by the authentication server 34 for authenticating a user 22. In step 202, the authentication server 34 obtains a biometric input comprising a plurality of biometric attributes distinct to a user 22. It will be appreciated that the server 34 may initially obtain the biometric input during an enrollment phase. Examples include facial images, etc.

In step 204, the authentication server 34 selects at least one biometric attribute in the obtained biometric input as a currently active biometric attribute. As discussed above, the database 52 in the server 34 will store user profiles 54. For example, as discussed in the previous paragraph, the biometric input may be obtained during an enrollment phase and stored in the user profiles 54. It will also be understood from the foregoing that the server 34 comprises a selection algorithm 144, which is synchronized with a similar algorithm 144 in the electronic device 30, for selecting at least one biometric attribute from the plurality of distinct biometric attributes in the obtained biometric input as a currently active biometric attribute. For example, the selection algorithm can be a time-varying selection algorithm facilitating selection of the at least one currently active biometric attribute for a predetermined period of time. It will be appreciated that at least one new biometric attribute can be periodically selected as a currently active biometric attribute. It will be further understood that the number of biometric attributes selected as currently active biometric attributes is less than the total number of obtained biometric attributes in the biometric input. It will also be understood that the non-selected biometric attributes are currently inactive for authentication. Alternatively, the selection algorithm may comprise an event based algorithm for facilitating selection of at least one biometric attribute as a currently active biometric attribute in response to an event based occurrence.

In step 206, the authentication server 34 creates a currently active biometric profile for the user for facilitating the authentication of the user based on the at least one selected currently active biometric attribute. It will be appreciated that the biometric profile for the user can change periodically depending on the selection algorithm. For example, if the selection algorithm is a time-varying algorithm the active biometric attributes will change periodically resulting in a new biometric profile for authentication.

However, it will be understood that in some embodiments the biometric input may be obtained during an enrollment phase and the selection algorithm can initially select at least one biometric attribute as the at least one currently active biometric attribute to be stored in the user profile 54. The selected attributes in the user profile can create a currently active biometric profile for the user for facilitating the authentication of the user. The remaining non-selected biometric attributes can be deleted from the server 34 such that if the selected attributes in the currently active profile are compromised the system administrator can simply revoke the profile and replace the profile with a new profile comprising different attributes.

It will also be understood that the at least one currently active biometric attribute can be selected from a selected subset of the obtained biometric input. For example, the biometric input can comprise left and right hand finger print biometrics. The method can select the left hand finger print biometrics and delete the right hand finger print biometrics. For example, a first selection algorithm can select the left hand and the right hand finger print biometrics can be deleted from the server. The method can subsequently select the at least one currently active biometric attribute using a second selection algorithm from the left hand finger print biometrics. For example, the left middle finger print can be selected using the second selection algorithm as the currently active biometric attribute.

It will be further understood from the foregoing that the electronic apparatus 30 outputs an authentication output including at least one biometric factor based on the at least one selected currently active biometric attribute. In this embodiment, the server 34 can receive the authentication output as an authentication input to a user authentication operation performed by the authentication server 34. It will be understood that the server 34 will make the decision to authenticate based on the currently active biometric profile and the authentication output of the electronic device. It will be appreciated that the at least one currently active biometric attribute which forms the basis of both the authentication output of the electronic apparatus and the currently active profile of the authentication server 34 will be the same by virtue of the selection algorithm.

It will be still further understood that in some embodiments the electronic apparatus 30 may co-operate with the server 34 such that the apparatus 30 can hint to the user 22 the currently active biometric attributes required to authenticate the user. In such an embodiment the user 22 will simply supply the active biometric attributes to the apparatus 30 rather than supplying the active and inactive attributes.

As mentioned above, an improved technique can provide authentication codes 42 which include token codes and biometric factors 46. As discussed above, such biometric factors 46 can be acquired from the various input circuits which are now commonly available and even offered as standard equipment on many electronic apparatus 30 (e.g., smart phones, tablets, laptops, etc.). It will be understood that in such an embodiment the server 34 will also comprise the cryptographic key and the soft token application for generating a token code such that the current token code can also be compared to the expected token code.

While various embodiments of the present disclosure have been particularly shown and described, it will be understood by those skilled in the art that various changes in form and details may be made therein without departing from the spirit and scope of the present disclosure as defined by the appended claims.

What is claimed is:
1. A system, comprising;
a network interface;
a memory; and
a controller which includes controlling circuitry coupled to the memory, the controlling circuitry being constructed and arranged to:
obtain a biometric input comprising a plurality of biometric attributes distinct to a user;
based on a first selection process, select a subset of biometric attributes in the obtained biometric input, wherein the number of biometric attributes selected is less than the total number of biometric attributes in the obtained biometric input;
based on the subset of selected biometric attributes, create a biometric profile for the user;
delete non-selected biometric attributes in the obtained biometric input such that, in the event the biometric profile is compromised, the biometric profile is revoked and replaced with a new biometric profile comprising one or more biometric attributes from the non-selected attributes;
select, using a second selection process, at least one of the attributes within the profile, wherein selected profile attributes are currently active for use in authentication and non-selected profile attributes are currently inactive for use in authentication, wherein the second selection process is configured to select at least one different attribute periodically as the currently active attribute for use in authentication;

receive an authentication request in connection with the user, wherein the authentication request comprises biometric attributes associated with the user; and perform an authentication operation based on the authentication request and the selected profile attributes.

2. A method, comprising;

obtaining a biometric input comprising a plurality of biometric attributes distinct to a user;

based on a first selection process, selecting a subset of biometric attributes in the obtained biometric input, wherein the number of biometric attributes selected is less than the total number of biometric attributes in the obtained biometric input;

based on the subset of selected biometric attributes, creating a biometric profile for the user;

deleting non-selected biometric attributes in the obtained biometric input such that, in the event the biometric profile is compromised, the biometric profile is revoked and replaced with a new biometric profile comprising one or more biometric attributes from the non-selected attributes;

selecting, using a second selection process, at least one of the attributes within the profile, wherein selected profile attributes are currently active for use in authentication and non-selected profile attributes are currently inactive for use in authentication, wherein the second selection process is configured to select at least one different attribute periodically as the currently active attribute for use in authentication;

receiving an authentication request in connection with the user, wherein the authentication request comprises biometric attributes associated with the user; and performing an authentication operation based on the authentication request and the selected profile attributes.

* * * * *